UNITED STATES PATENT OFFICE

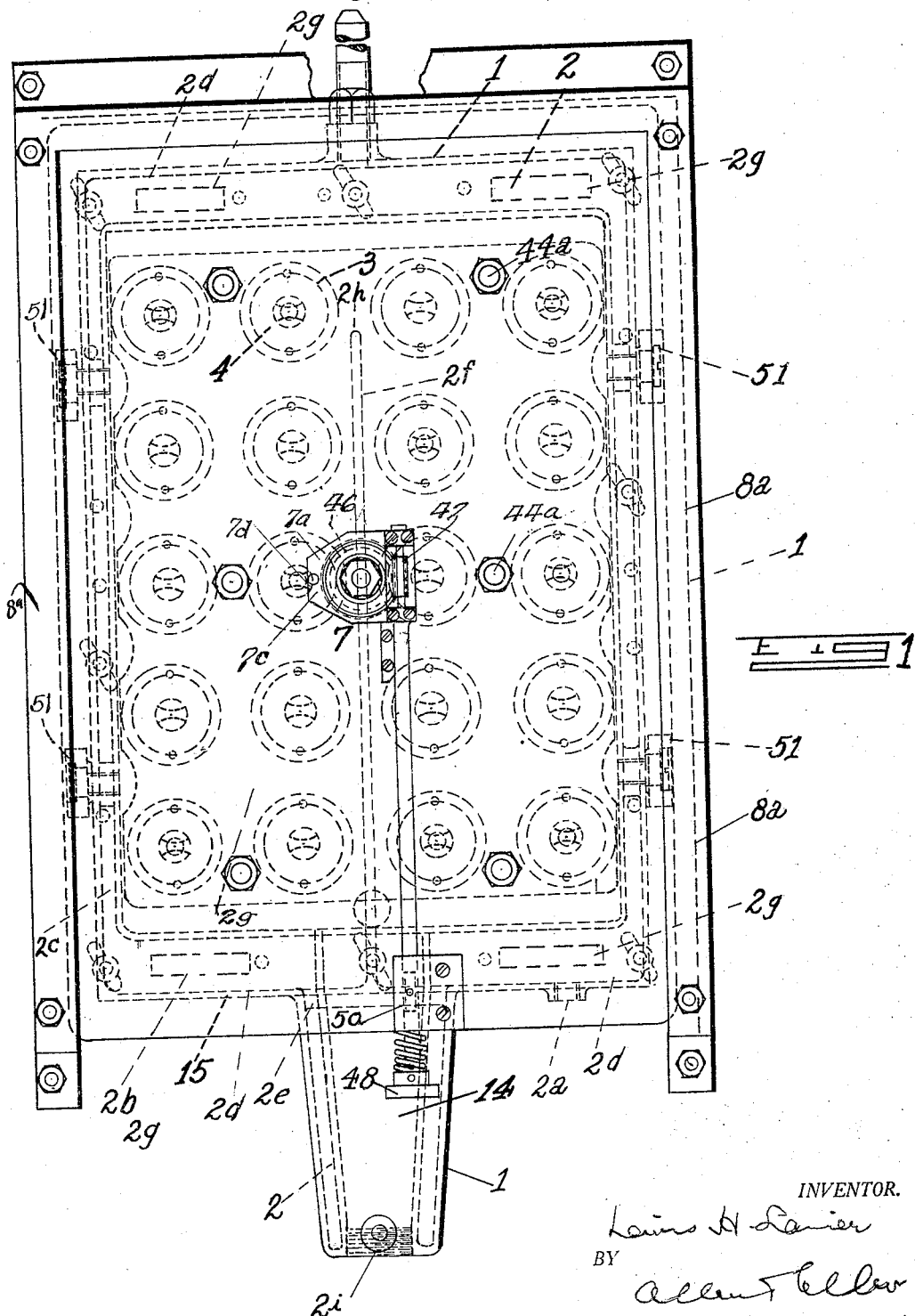

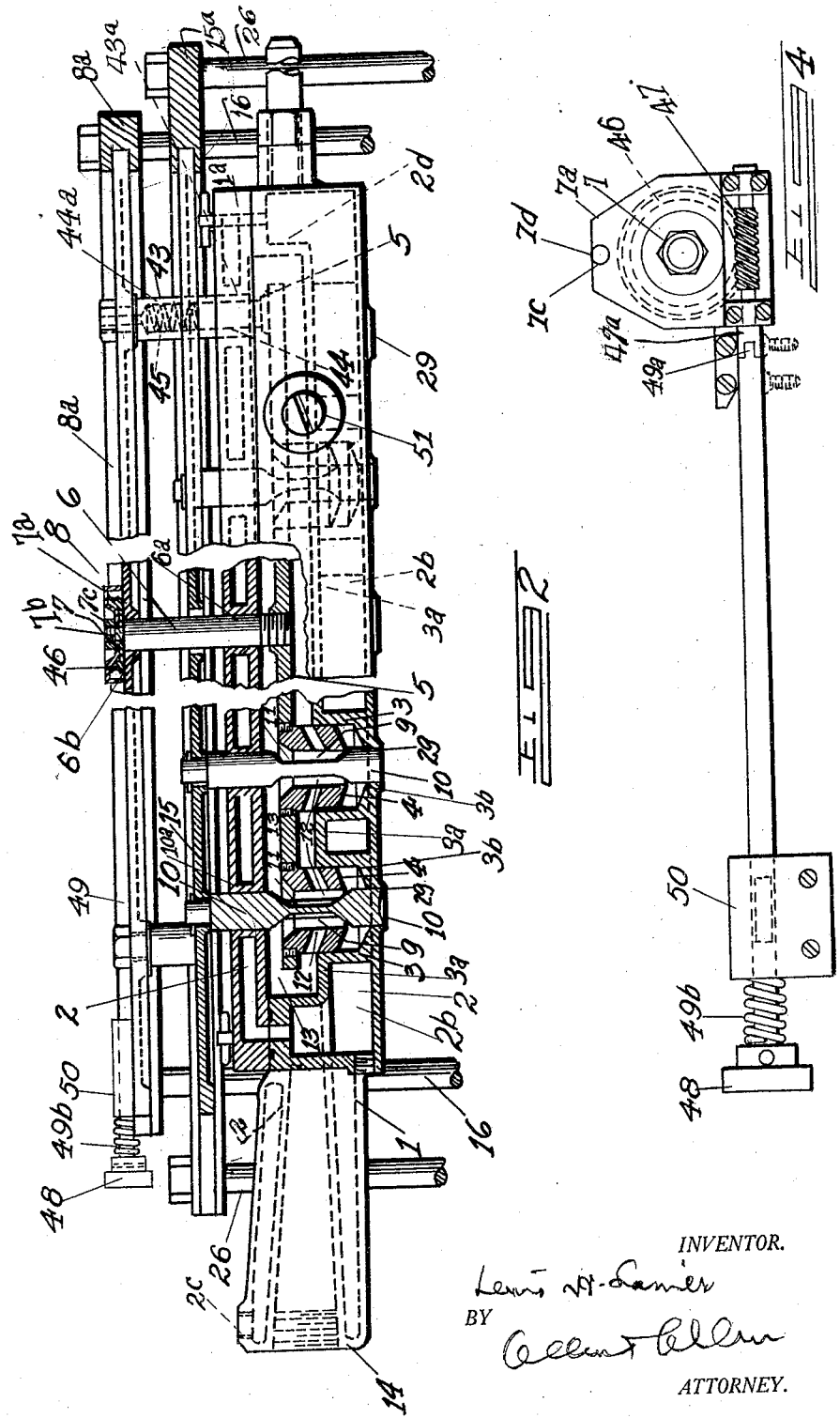

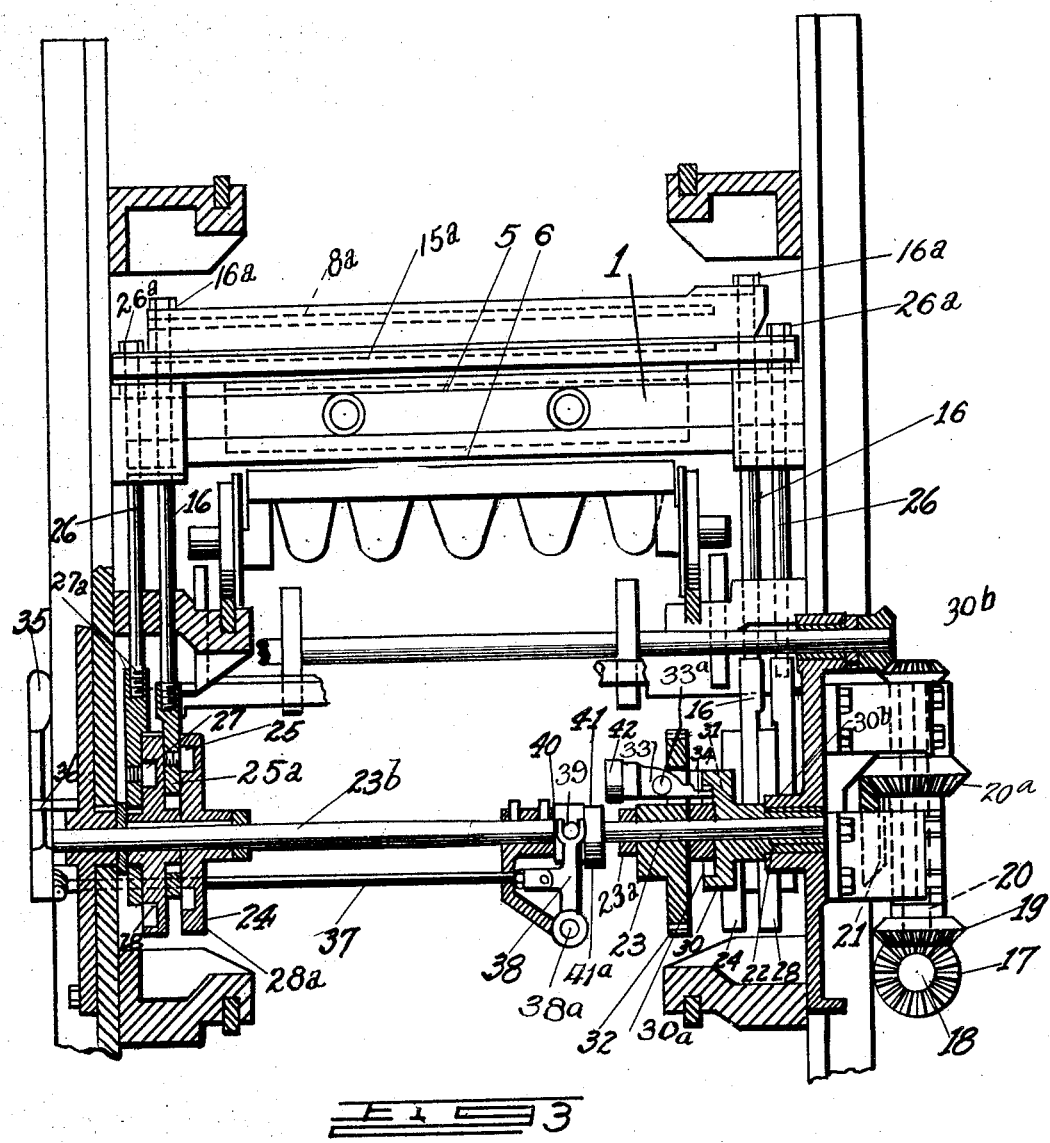

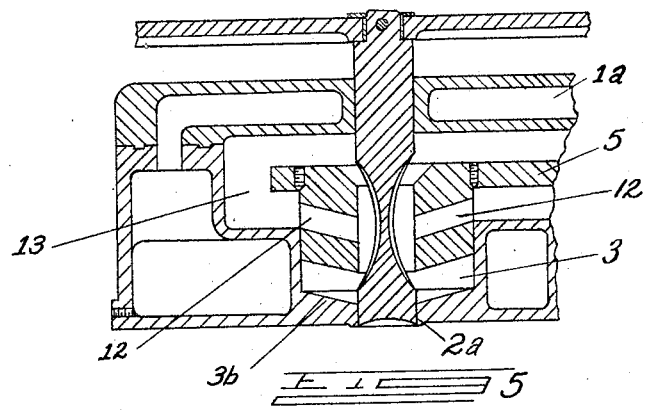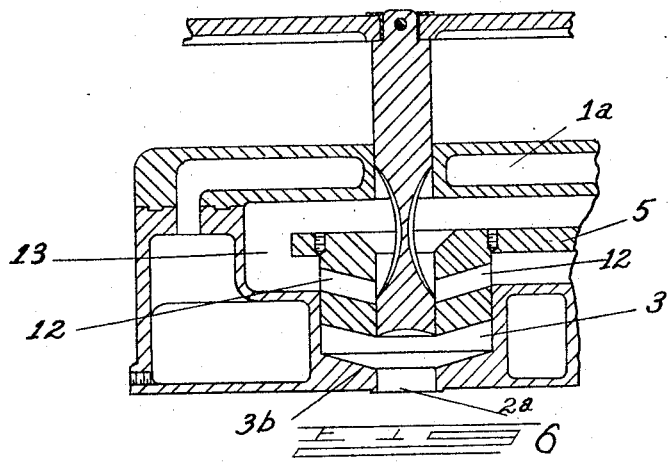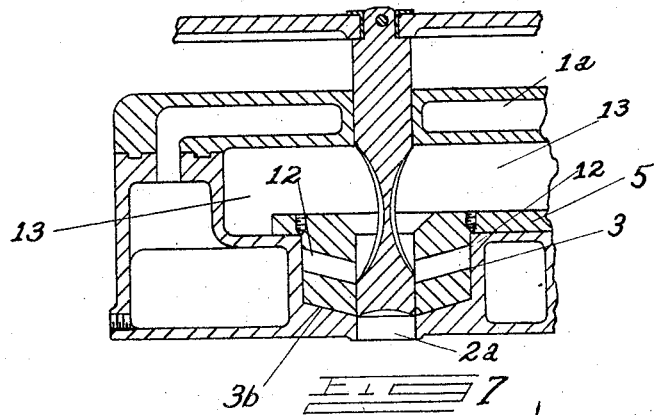

LEWIS H. LANIER, OF NEWPORT, KENTUCKY, ASSIGNOR TO LANIER CONE COMPANY, OF CINCINNATI, OHIO, A CORPORATION OF OHIO

FILLING DEVICE

Application filed October 10, 1928, Serial No. 311,544. Renewed May 3, 1932.

My invention relates to measuring and dispensing devices in which a predetermined amount of liquid, plastic or powdered material is accurately measured before it is dispensed.

In my co-pending application Serial No. 144,831, filed October 28, 1926, I have described a pastry shell baking machine. Reference is hereby made to the aforementioned application for which the measuring and dispensing device herein described is particularly adapted. Notwithstanding the fact that the combination and arrangement of parts in my novel measuring and dispensing unit is particularly adapted for my pastry shell baking unit it is also adaptable for many other uses both in single or multiple measuring and dispensing units and in the combination with the other units of similar structures such as are required for a baking machine.

It is the object of my invention to provide a measuring and dispensing device which will accurately measure a predetermined amount of material before dispensing and which will then dispense without dripping.

The material to be measured and dispensed enters my device through a flexible hose which may be provided to allow freedom of movement of the measuring and filling unit while it is being inserted or removed in a machine such as the one with which I have shown my novel filling unit in combination. I have shown my filling unit in combination with a pastry shell baking machine although it will serve a useful purpose with other types of machines. The hose connects to an overhead tank which is preferably open at the top in order to permit any entrained air in the batter or material to escape to the atmosphere. It is preferable to avoid entrained air pockets as they interfere with the accurate measurement of the batter or other liquid material in the measuring pockets.

When the batter is admitted it first flows into the measuring pockets through a plurality of supply passages provided in each of the displacement plungers. After filling the measuring pockets the continued flow of the batter fills the space above them until the entire device is filled throughout. This above mentioned space provides a reserve supply of batter or material within the container of my device. The batter flows into the container by gravity due to the difference in level of the measuring device and the overhead supply tank. Most of the air is set free from the batter or material during its passage from the overhead tank to the measuring device. Should any air find its way into the measuring device it can escape through a plug opening at the top of the measuring device or around the multiple cut-off plungers which are slidably mounted in the lid of the measuring device.

As noted, the batter flows into the measuring pockets through the passages provided in the displacement plungers. Filling the pockets is practically instantaneous so that there is ample time for the other operations of the measuring device. At the proper time the cut-off plungers are raised collectively by the plate to which they are loosely mounted and trap the batter or material that is in the measuring pockets. They also stop any further flow of batter into the measuring pockets during the dispensing operation. The cut-off plungers are raised sufficiently to bring their bottoms on the level with the bottoms of the displacement plungers. When they are in this position the cut-off and displacement plungers move down as a single unit and force out all batter or material that has not run out of the measuring pockets by gravity. They move down together until the displacement plungers seat on the conical bottoms of the measuring pockets where the displacement plungers remain at rest while the cut-off plungers continue to move, closing off the outlet ports before they come to rest. At the point of rest the displacement plungers alone move back up and come to rest at a point where the plurality of passages in them will be opened to receive a fresh measure of batter or material. Since it is necessary to vary the amount of batter or materials to the measuring pockets I have provided an adjusting screw to the displacement plungers. This screw regulates the volume of all the measuring pockets at once by raising or lowering a plate to which the displacement plungers are fixed within the measuring device. The adjustment is controlled by an external source such as a worm and worm wheel of such ratio as to provide the necessary practical micrometric measurement.

My measuring device is preferably synchronized with the intermittent movement of receptacles into position to receive the batter or material from the measuring device. I have further provided means for maintaining a fixed distance of movement for the plunger plates thereby eliminating the necessity of changing cams from which the reciprocating motion of the plungers is derived. To make this possible I have cushioned the displacement plungers with springs which compress when the displacement plungers seat themselves on the conical bottoms of the measuring pockets and allow the plates to move through the distance allotted without it becoming necessary to vary the movement of the cut-off plungers.

A novel feature of my device is the hollow chamber surrounding the measuring container. This chamber is intended as a cooling medium on my device but it may also be used in a heating capacity. I normally circulate cooling water through the cooling chamber. In my structure it is one of my objects to direct cooling water in a definite line of flow by means of baffles cast within the chamber. This insures a relatively uniform temperature throughout. Notwithstanding the fact that when used in a baking machine very high temperatures are required, it is possible to keep my device at such a temperature that it will be only a few degrees warmer than the cooling medium used.

The above and other objects to which reference will be made in the ensuing disclosure I accomplish by that certain combination and arrangement of parts of which I have shown a preferred embodiment.

In the drawings:—

Figure 1 is a plan view of the multiple measuring and dispensing device.

Figure 2 is a side elevation showing fragmentary portions in section.

Figure 3 is an end elevation of the measuring and dispensing assembly with parts of the machine frame illustrated in section and also showing in section portions of a drive for the various reciprocating parts of the device.

Figure 4 is a plan view of the adjusting mechanism detached from the measuring device.

Figure 5 is a section through a measuring pocket in filling position.

Figure 6 is a section through the measuring pocket illustrated in Figure 5 with batter cut-off and the plungers at the beginning of a wiping out stroke of the measuring pockets.

Figure 7 is a section through the measuring pocket illustrated in Figures 5 and 6 after all the batter has been displaced and the cut-off plungers are ready to close the discharge port.

My device consists of a casing 1 which comprises a hollow chamber 2 through which water is circulated for cooling purposes. It is apparent that this chamber can be used as a heating medium if desired. The heating or cooling medium enters through the opening $2a$ to which may be connected a flexible hose or any other suitable means for conveying cooling or heating liquids. The cooling water passing into the main cooling chamber, flows all around the left side $2c$, the front and the back $2d$, and the bottom $2b$. In order that the cooling water will follow a definite course, I have provided the dividing ribs $2f$ both in the bottom chamber and in the upper chamber of the lid. After passing around the bottom the water finds its way into the cooling chamber $1a$ of the lid through the openings or channels $2g$ in the measuring device. All the cooling water coming from the left side must pass around the end $2h$ of the dividing rib $2f$ before it can find its way out of the cooling chamber through the outlet $2i$ in the lid of the measuring device. In the case of the bottom or main cooling chamber the water entering it must first pass around the left side and find its way around the end $2h$ of a similar dividing rib $2f$. After passing around this end $2h$ it finds its way around the bottom of the right side and rises through the opening $2g$ at the front and the rear of the measuring device. From thence it flows through the outlet $2i$. The cooling chamber is completely filled with the cooling water at all times and a constant flow is maintained through the inlet and outlet. This constant flow keeps the measuring device and the batter or material within the filling compartment at such a temperature as to preserve it against the intense heat of my baking machine. There is no chance for the cooling water to come in contact with the batter or material being measured because they are separated by cast walls which form the outlines of the batter reservoir and measuring pockets.

The inner chamber of my device which is separated from the cooling chamber by the walls $3a$ consists of the upper portion 13 of sufficient size to carry a reserve supply of batter or material and the lower portion divided into a multiple number of measuring pockets 3 of sufficient size to give the maximum amount of batter or material required at any one time. The bottoms of these measuring pockets 3 have the tapered bottoms $3b$ so that the material may flow very readily through the outlet ports 29. In these measuring pockets I have slidably mounted the displacement plungers 4 which force out all batter or material that has not flowed out by gravity from the measuring pockets. Batter or material can only flow into the measuring pockets when the plungers are in the position shown in Figures 2 and 5. The batter or material enters the measuring pockets through the passages 12 in the displacement plungers from the reservoir 13. Additional space is also provided around the cut-off plungers through the hole 9 in the displacement plungers which also form guide bearings for the cut-off plungers 10. This additional space or passage decreases the time required to fill the measuring pockets. The displacement plungers are rigidly mounted on the gang plate 5 which moves them up and down as a unit. The plate 5, as well as the displacement plungers, are completely immersed in the batter within the reservoir of the measuring device.

The plate 5 is connected to a common lifting plate 8 outside of the filling device by means of the adjusting stud 6 and the six telescoping spring cushioned studs 43. These telescoping studs consist of the male studs 44 which are rigidly mounted in the plate 5 and the female part of the sleeve-like upper portion 44a. The male stud 44 is free to slide in the female part of the sleeve 44a. Inside the sleeve 44a I have mounted a compression spring 45 which bears on the top of the stud 44 and tends to push the plate 5, with the displacement plungers on it, down into the measuring pockets. The spring acts as a cushion and allows the plate 8 to continue on its downward movement even though the displacement plungers cannot move down because they are blocked by the bottoms of the measuring pockets. The female end of the telescoping stud 43 is guided and slidably mounted in the bearing 43a in the lid of my measuring device. The adjusting stud 6 which is threaded on its lower end and thus screwed into the plate 5 is the link which supports and prevents the displacement plungers from moving downward into the measuring pockets prematurely. The upper end 7b of the stud 6 is turned down to receive the worm wheel 46 and the worm bearing 7a which also acts as a thrust bearing for the worm wheel. The worm wheel and the worm bearing are held in place by the nut 7. This worm wheel 46 is keyed to the adjusting stud 6 and is the means for turning the stud for adjustment. While the stud 6 is free to rotate in the worm bearing, the worm bearing itself is prevented from doing so by the pin 7d fixed in the plate 8 and slidably mounted in the slot 7c in the worm bearing. This construction allows the worm wheel, the worm and its bearing to remain at rest while the plate continues to move downward. The bottom face of the worm wheel bears on the plate 8 which pulls the stud 6 upward and hence raises all the displacement plungers by means of the plate 5. The stud 6 is slidably mounted in the bearing 6a in the lid and the bearing 6b in the plate 8. This sliding bearing 6b allows the plate 8 to move down and away from the worm wheel when the displacement plungers, and hence the adjusting stud, have come to rest on the downward movement.

In order to change the volume of the measuring pockets I merely turn the adjusting stud 6 through the hand wheel 48 mounted on its shaft 49 which is rotatably mounted in the bearing 50 which in turn is rigidly mounted on the plate 8. One end of this shaft 49 is squared off to fit in the slotted end 47a of the worm. The reason for this arrangement is to separate the shaft from the worm so that it can move independently in an opposite direction, while the shaft remains at rest on the top of the plate 8. The squared end of the shaft will pull out of the slot as soon as the hand wheel is released because of the spring 49b which forces the hand wheel on the shaft away from the fixed bearing 50 and hence carries the shaft with its squared end along with it. Turning the worm with the shaft rotates the worm wheel and hence the adjusting stud which in turn raises or lowers the displacement plungers in the measuring pockets and thereby increases or decreases the free volume of the measuring pockets.

The cut-off plungers 10 are loosely mounted in their lifting plate 15 and slidably guided in the bearings 10a in the lid, the hole 9 in the displacement plungers and the outlet ports 29 in the main casing. These plungers stop the flow of batter or material from and into the measuring pockets. They also assist in the forcing out any residual batter that may not flow out of the measuring pockets by gravity. The purpose of the loose mounting in the plate 15 is to alleviate any binding action and allow the plungers to adjust their alignment when entering the outlet ports. The bottoms of the cut-off plungers have concave surfaces 10b which eliminate dripping of the batter or material at the end of the dispensing operation.

My device is easily removed from a baking machine because the entire device which comprises the lifting plates and the casing with the measuring pockets within is supported on the wheels 51 which ride between the rails 52. These rails keep the measuring device from moving up and down and allow only the plates to move in that manner. The sides and the backs of the carrying plates slide into the channeled frames 8a and 15a which are moved up and down and hence transmits this up and down movement to the displacement and cut off plungers. The mechanism which imparts this motion will be described and forms no part of my invention, particularly the clutch.

The mechanism is the means employed to time the dispensing of batter or material with the moving molds which are the receiving containers in my baking machine. No batter or material is discharged into the molds until they are in the proper position beneath the measuring and dispensing device. To accomplish this I have mounted the bevel gear 17 on the main driving shaft 18 of the baking machine. Meshing with this gear 17 is another bevel gear 19 mounted on the shaft 20 on the end of which is a third bevel gear 20a. This last mentioned gear is in mesh with the gear 21 which is mounted on the driving end of the clutch 30 shown in section of Figure 3. The main shaft, the bevel gears and the driving end of the clutch rotate constantly. The clutch end 30 is rotatably mounted on the shaft 23 which is fixed from rotation in the two side frames. A collar 30a mounted on the shaft 23 and within the counter-bore of the driving end of the clutch and the boss 30b of the main frame confine the driving end of the clutch from lateral movement. On the fixed shaft 23 is rotatably mounted the driven end of the clutch 32 in the form of a gear and carries the pivotally mounted clutch tooth 33 whose end point 34 engages in a slot 31 within the driving end of the clutch. To disengage the clutch I move the pivotally mounted lever 35 to the left and it moves the link 37 to the right. Moving the link 37 to the right rotates the fork member 38 about its pivot point and it in turn moves the non-rotating sliding collar 40 to the right by means of the pin 39 which is fixed in the collar 40 and free to rotate in the forked opening of the member 38. This collar 40 has an eccentric cam surface 41 upon which the roller 42 on the clutch tooth is free to rotate when the cam surface is pushed in line with the roller 42. When the cam surface 41 and the roller 42 are in contact the clutch gear 32 will be released and stop rotating as soon as the roller comes to the high point 41a of the cam. The high point of the cam pushing on the roller of the clutch tooth causes the tooth to rotate about its pin 33a and disengage its end 34 from the slot in the constant rotating clutch end 31. Since the gear clutch stops rotating when the clutch tooth is disengaged the roller on the clutch will remain on the high point of the cam and cannot go into engagement until the cam surface 41 is pulled to the left. When the cam surface is pulled to the left the clutch tooth rotates counterclockwise by reason of the weight of the roller and allows its end point free to engage the slot in the driving end of the clutch. Since I have provided a single toothed clutch and a solitary point of engagement or disengagement it is apparent that my measuring device will always be in time with my baking molds which are also driven positively by the main drive shaft 18. The channeled frames 8a and 15a are the means provided for moving the carrying plates 8 and 15 up and down and they move independent of each other. These frames are supported and rigidly mounted on the reciprocating rods 16 and 26 by the nuts 26a and 16a at the top. On the lower ends of these rods I have mounted the cam roller supports and guides 25a and 27a. The supported cam rollers 25 ride in their respective cam grooves in the internal cams 28 and 24 and rise and fall a fixed amount with every revolution of the cams. It is obvious that the same rise and fall of the rollers is transmitted to the cut-off plungers and displacement plungers through their respective plates, frames and rods. The cams are fixedly mounted on the two similar rotatable shafts 23b rotated by two similar gears also fixedly mounted on this same shaft 23b. The two gears one on each of the two shafts 23b mesh on opposite sides of the clutch gear 32 which drives them in opposite directions. These last mentioned gears along with the gear clutch rotate only during the time that the clutch tooth is engaged in the slot on the driving end of the clutch.

The sequence of operations of my device is as follows: When the clutch is engaged the gear 32 which is in mesh with the other two gears on the cam shafts rotates the cams towards their high point. The cam 28 is a little in advance of the cam 24 and starts the roller 25 upward and hence lifts the cut-off plungers by means of its plate 15 and the rods 26. This operation opens the discharge ports and allows the batter or material which has been measured to flow out. The cut-off plunger has also shut off the batter from the reservoir to the measuring pockets previous to opening the discharge ports. The continued movement of the cam 28 causes the bottoms of the cut-off and displacement plungers to come into line. When their bottoms are in line the rollers 27 will be on the high point of the cam 28 while the rollers 25 in the cams 24 will be at the point of going down to its lowest point. Since all the cam rollers are now descending their holders and the rods do likewise and cause the plates 8 and 15 to push the cut-off and displacement plungers down as a single unit. The displacement plungers come to rest on the bottom of the measuring pockets while the plate 8 continues to move downward its allotted distance, being free to do so because of the compression springs 45. During this time the cut-off plungers will have wiped out any batter that had remained in the outlet ports and come to rest. At the time when the cut-off plungers come to rest the displacement plungers rise to their stopping position and thereby open the channels 12 and the holes 9 which admit a fresh supply of batter to the measuring pockets preliminary to dispensing the batter into the next succeeding mold container.

Having thus described my invention, what I claim as new and desire to secure by Letters Patent, is:—

1. A machine for dispensing measured quantities of material comprising a casing having a hollow interior with measuring pockets tapering into narrowed discharge apertures, displacement plungers having inlet passages movable within the measuring pockets and cut-off pistons having inlet passages movable within the displacement plungers of such size as to force out material from the pockets and narrowed discharge apertures.

2. A machine for dispensing measured quantities of material comprising a casing having a hollow interior with measuring pockets tapering into narrowed discharge apertures, displacement plungers having inlet passages movable within the measuring pockets, and cut-off pistons having inlet passages movable within the displacement plungers of such size as to wipe out the contents of the narrowed discharge apertures, said cut-off plungers having concave end surfaces to prevent accumulation of material thereon.

3. In a machine for dispensing a measured quantity of material, a casing having a reservoir for a supply, and a measuring pocket, a displacement plunger reciprocable within the measuring pocket, said plunger having a hollow interior, a cut-off plunger reciprocable within said displacement plunger having a greater range of movement than the displacement plunger, a wall of the casing being narrowed adjacent the measuring pocket, and the cut-off plunger having inlet passages movable through said narrowed portion to wipe out and insure delivery of the entire contents thereof.

4. In a machine for dispensing a measured quantity of material, a casing having a reservoir for a supply, and a measuring pocket, a displacement plunger reciprocable within the measuring pocket, said plunger having a hollow interior, a cut-off plunger reciprocable within said displacement plunger having a greater range of movement than the displacement plunger, a wall of the casing being narrowed adjacent the measuring pocket, and the cut-off plunger movable through said narrowed portion to wipe out the contents thereof, said displacement plunger having passages therethrough to permit the flow of material into said measuring pockets.

5. In a machine for dispensing a measured quantity of material, a casing having a reservoir for a supply, and a measuring pocket, a displacement plunger reciprocable within the measuring pocket, said plunger having a hollow interior, a cut-off plunger reciprocable within said displacement plunger having a greater range of movement than the displacement plunger, a wall of the casing being narrowed adjacent the measuring pocket, and the cut-off plunger movable through said narrowed portion to wipe out the contents thereof, said displacement plunger having passages therethrough to permit the flow of material into said measuring pockets, and said cut-off plunger provided with a narrowed neck forming a passage for material in the hollow interior of the displacement plunger leading into the measuring pocket.

6. In a machine for dispensing a measured quantity of material, a casing having a reservoir for a supply, and a measuring pocket, a displacement plunger reciprocable within the measuring pocket, said plunger having a hollow interior, a cut-off plunger reciprocable within said displacement plunger having a greater range of movement than the displacement plunger, a wall of the casing being narrowed adjacent the measuring pocket, and the cut-off plunger movable through said narrowed portion, said displacement plunger having passages therethrough to permit the flow of material into said measuring pockets, and said cut-off plunger provided with a narrowed neck to form a passage for material in the hollow interior of the displacement plunger leading into the measuring pocket, and means for operating said displacement and cut-off plunger in a timed cycle of filling and dispensing operations.

7. In a machine for dispensing a measured quantity of material, a casing having a reservoir for a supply, and a measuring pocket, a displacement plunger reciprocable within the measuring pocket, said plunger having a hollow interior, a cut-off plunger reciprocable within said displacement plunger having a greater range of movement than the displacement plunger, a wall of the casing being narrowed adjacent the measuring pocket, and the cut-off plunger movable through said narrowed portion to wipe out the contents thereof, said displacement plunger having passages therethrough to permit the flow of material into said measuring pockets, and said cut-off plunger provided with a narrowed neck to form a passage for material in the hollow interior of the displacement plunger leading into the measuring pocket, and means for operating said displacement and cut-off plunger in a timed cycle of filling and dispensing operations, said means for operating said displacement plunger being adjustable to various positions wherein the quantity retained within the measuring pocket may be controlled.

8. In a machine for dispensing a measured quantity of material, a casing having a reservoir for a supply, and a measuring pocket, a displacement plunger reciprocable within the measuring pocket, said plunger having a hollow interior, a cut-off plunger reciprocable within said displacement plunger having a greater range of movement than the displacement plunger, a wall of the casing being narrowed adjacent the measuring pocket, and the cut-off plunger movable through said narrowed portion to wipe out the contents thereof, said displacement plunger having passages therethrough to permit the flow of material into said measuring pockets, and said cut-off plunger provided with a narrowed neck to form a passage for material in the hollow interior of the displacement plunger leading into the measuring pocket, and means for operating said displacement and cut-off plunger in a timed cycle of filling and dispensing operations, said means for operating said displacement plunger being adjustable to various positions wherein the quantity retained within the measuring pocket may be controlled, and means for cushioning the end of the displacement plunger stroke.

9. A machine for dispensing measured quantities of material comprising a casing having a hollow interior with measuring pockets tapering into narrowed discharge apertures, displacement plungers having inlet ports movable within the measuring pockets to force out the contents thereof, and cut-off pistons movable within the displacement plungers of such size as to close said inlet ports in said displacement plungers and wipe out the contents of the narrowed discharge apertures, and means for controlling the operation of said displacement and cut-off plungers in a cycle of filling and dispensing operations.

10. A filling machine comprising a hollow casing provided with an inlet, a series of displacement plungers, a series of measuring pockets the entry into which is closed by the displacement plungers, said plungers having hollow interiors with passages from the hollowed portion of the casing into the measuring pockets, a series of cut-off plungers movable within the displacement plungers, and means for reciprocating both series of plungers in a cycle of filling and dispensing operations.

11. A filling machine comprising a hollow casing provided with an inlet, a series of displacement plungers, a series of measuring pockets the entry into which is closed by the displacement plungers, said plungers having hollow interiors with passages from the hollowed portion of the casing into the measuring pockets, a series of cut-off plungers movable within the displacement plungers, and means for reciprocating both series of plungers in a cycle of filling and dispensing operations, and means for cushioning the stroke of the displacement plungers at the end of their downward stroke.

12. A filling machine comprising a hollow casing provided with an inlet, a series of displacement plungers, a series of measuring pockets the entry into which is closed by the displacement plungers, said plungers having hollow interiors with passages from the hollowed portion of the casing into the measuring pockets, a series of cut-off plungers movable within the displacement plungers, and means for reciprocating both series of plungers in a cycle of filling and dispensing operations, and means for cushioning the stroke of the displacement plungers at the end of their downward stroke, and means for carrying the displacement plungers back from the end of their discharge stroke providing sufficient clearance to permit the operation of said cushioning means.

13. A machine for filling measured quantities of material having measured quantity filling pockets, with gravity feeding means for filling said pockets and force feed discharging means for discharging material therefrom, said means comprising hollow displacement plungers with hour glass shaped cut-off plungers reciprocable within said displacement plungers.

14. A machine for filling measured quantities of material in simultaneous discharges comprising a hollow casing having a series of measuring pockets, a series of displacement plungers with inlet ports reciprocable within the measuring pockets, and a plate to which said plungers are attached, a series of cut-off plungers with inlet channels reciprocable within said displacement plungers and a plate to which said plungers are attached, and means for reciprocating both said plates in timed cycles of filling and dispensing operations, said means comprising a supporting adjustable stud with an adjustment screw interspaced at the center thereof for elevating and lowering the plate to which the displacement plungers are attached and said screw movable in relation to said reciprocating means during operation.

15. A machine for filling measured quantities of material in simultaneous discharges comprising a hollow casing having a series of measuring pockets, a series of displacement plungers reciprocable within the measuring pockets, and a plate to which said plungers are attached, a series of cut-off plungers reciprocable within said displacement plungers and a plate to which said plungers are attached, and means for reciprocating both said plates in timed cycles of filling and dispensing operations, said means comprising an adjustable supporting stud with an adjustment screw interspaced at the center thereof for elevating the plate to which the displacement plungers are attached, and cushioning means for cushioning the displacement plungers at the end of their discharging stroke.

LEWIS H. LANIER.